: 
United States Patent [19]

Lin et al.

[11] Patent Number: 5,842,222

[45] Date of Patent: Nov. 24, 1998

[54] PRODUCTION INFORMATION SYSTEM ENHANCED FOR AVAILABILITY

[75] Inventors: Chun-Ching Lin, I-Lan; Yi-Hsin Chan, Chu-Pei; Hung-Chieh Hsu, Miaoly; Shih-Yung Lo, Hsin-Chu, all of Taiwan

[73] Assignee: Taiwan Semiconductor Manufacturing Company, Ltd., Hsin-Chu, Taiwan

[21] Appl. No.: 725,803

[22] Filed: Oct. 4, 1996

[51] Int. Cl.[6] .................................................... G06F 17/30
[52] U.S. Cl. ........................................... 707/202; 707/204
[58] Field of Search .................................... 707/200, 202, 707/204, 201

[56] References Cited

U.S. PATENT DOCUMENTS

| | | | |
|---|---|---|---|
| 4,686,620 | 8/1987 | Ng .............................................. | 707/10 |
| 5,170,480 | 12/1992 | Mohan et al. ........................... | 707/201 |
| 5,182,705 | 1/1993 | Barr et al. .................................. | 705/11 |
| 5,381,545 | 1/1995 | Baker et al. ........................ | 395/182.17 |
| 5,548,750 | 8/1996 | Larsson et al. .......................... | 707/204 |
| 5,592,660 | 1/1997 | Yokota et al. .............................. | 707/8 |
| 5,640,561 | 6/1997 | Satoh et al. .............................. | 707/202 |

*Primary Examiner*—Thomas G. Black
*Assistant Examiner*—Jack M. Choules
*Attorney, Agent, or Firm*—George O. Saile; Stephen B. Ackerman

[57] ABSTRACT

A method for providing high availability in a production information system is described. The information system consists of a primary and a secondary copy running on a dual machine architecture. A backup database is added to the system which is updated daily from a transaction log. Database maintenance and archive procedures are performed on the data in the backup database relieving the primary and secondary databases of this activity. Database conversion is performed periodically, and the backup database is used to fill in for the primary and secondary databases when they are being converted.

12 Claims, 4 Drawing Sheets

PRODUCTION INFORMATION SYSTEM ENHANCED FOR AVAILABILITY

BACKGROUND OF THE INVENTION

1. Field of Invention

This invention relates to production information systems and in particular to providing a means to increase availability during database maintenance.

2. Description of Related Art

It is critical to provide high availability for production information systems that are used to control production processes including the logging of production transactions. It is inevitable that a certain amount of time is necessary for maintenance of the associated databases, but it is important to keep this at a minimum. An important function in any database system is to maintain a backup database so that if anything goes wrong with the primary database the system can be switched over to the backup. Keeping this backup database updated efficiently is important to providing high availability. In U.S. Pat. No. 5,381,545 (Baker et al.) a log is used for the incremental changes to the backup database since the last full backup was made. Periodically the log is applied to the backup database bringing it up to the level of the primary database. In U.S. Pat. No. 4,686,620 (Ng) a method for generating a backup copy of a database is described. Updates to the main database is summarized in a bit map on a page basis. When the next backup copy is made, only the pages that have changed are applied to the backup database.

In both these references attempts are made to reduce the demands on the availability of the primary system by minimizing the amount of data that needs to be updated in between the full backup of the primary database. Another important aspect of maximizing system availability is to perform database maintenance processes on a backup database away from the primary system and database. Important database maintenance functions include archiving and deleting data, backup data to tape and database conversion and can require considerable amount of time to perform.

SUMMARY OF THE INVENTION

A dual machine production information system, having a primary and secondary sides with primary and secondary data bases, is enhanced to provide improved availability by adding a third database for backup and database maintenance. The backup database is up dated daily by applying the incremental changes stored in the transaction log. This brings the backup database up to date with respect to the primary database once each day. Besides providing backup to the primary and secondary databases, the backup database provides a means to perform all database maintenance off line away from the production activity that use the primary and secondary databases. Maintenance activity such as data deletion, archiving and backing up to tape are performed using the backup database.

Periodically a database conversion is done using a temporary data base to minimize the effects on the production use of the system. The backup database being first to be converted is used by the primary and secondary systems while the primary and secondary databases are being converted. The backup database files are converted to the temporary database after which the backup database is deleted, and then the converted files in the temporary database are copied to the backup database. Next the secondary system is shut down and the backup database is assigned to the secondary system. The secondary system is brought up using the backup database, and the secondary database is deleted. Upon deletion of the files in the secondary database, the converted files from the temporary database are copied to the secondary database. Once this is accomplished both the primary and secondary systems are shut down, and the backup data base is assigned to the primary system. The primary system is brought back up using the backup database, and the primary database is deleted. Then the converted files contained in the temporary database are copied to the primary database. At this point all the databases are converted and synchronized. The systems are once more shut down and brought back up with the system using the primary database once again.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
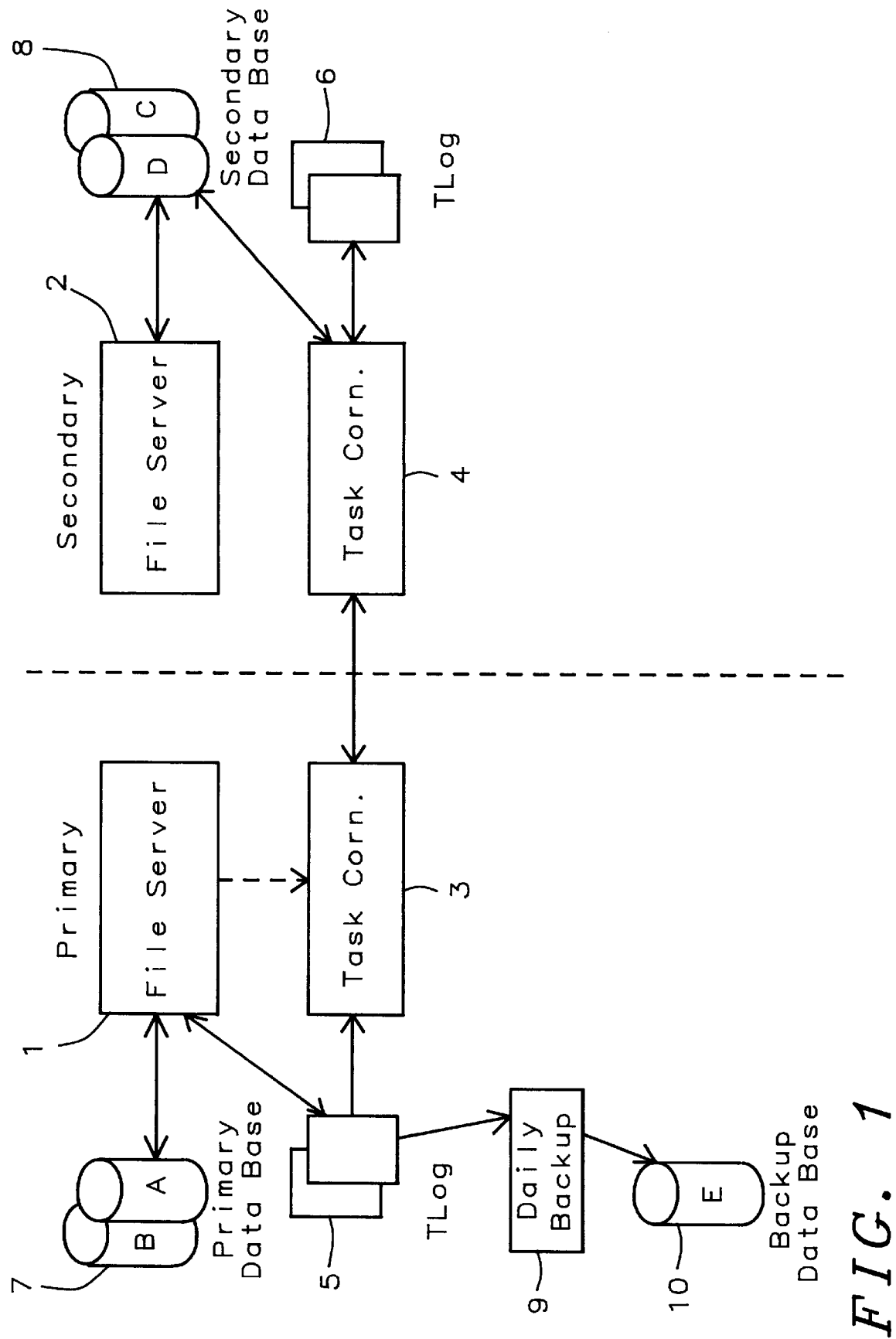
FIG. 1 is a schematic of the dual machine production information system of the invention.

Shown in FIG. 1 is a dual machine structure having primary and secondary sides and running a production information system. Each side contains a file server 1 and 2, a task communicator 3 and 4, and a transaction log 5 and 6. A primary database 7 is connected to the file server 1 on the primary side, and a secondary database 8 is connected to the file server 2 on the secondary side. A primary transaction log 5 is connected to the file server 1 on the primary side, and is used to maintain a log of incremental changes to the primary database 7. The secondary transaction log 6 is maintained as a backup to the primary transaction log 5 and is updated after the primary transaction log 5. The primary transaction log 5 is used by the daily backup process 9 to update the backup database 10. The task communicator 3 on the primary side communicates with the task communicator on the secondary side 4 and allows the production information system running on the primary file server 1 to communicate with the secondary database 8 and the transaction log 6 on the secondary side.

Figure 2:
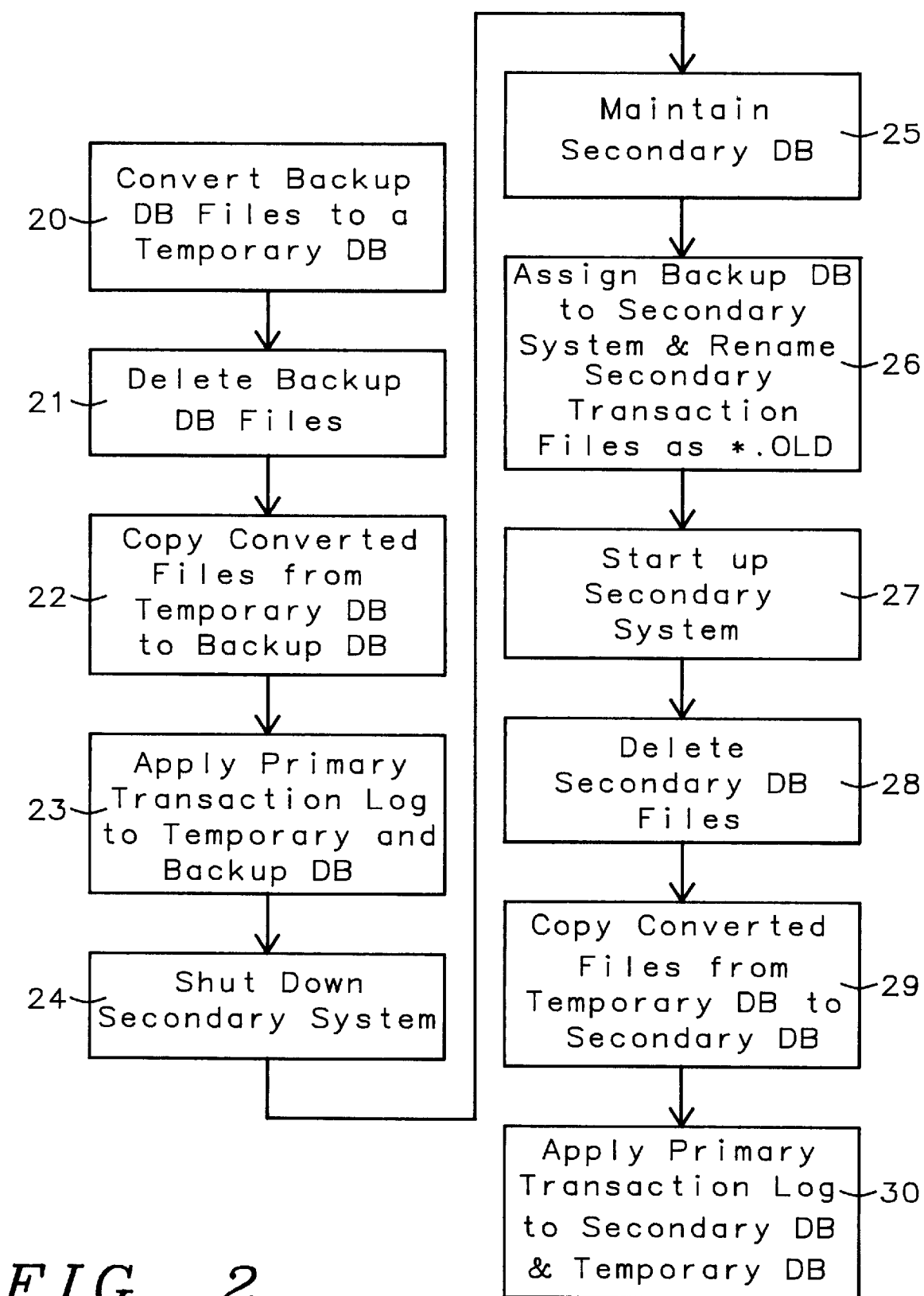
FIG. 2 is a flow diagram of the database conversion process.

Periodically a conversion process is applied to all the data bases to facilitate re-establishing a clean and synchronized set of databases. Shown in FIG. 2 is the database conversion process which utilizes the backup database 10 to minimize down time of the production information system as the conversion process takes place. A temporary database is established using spare disk space and the backup database is converted to the temporary database 20. Then the backup data base files are deleted 21 and the converted files in the temporary database are copied to the backup database 22. Then the primary transaction log is applied to both the temporary database and the backup database 23 to bring these databases up to date with the most recent changes to the primary database. Next the secondary production information system is shut down 24 while maintaining the secondary database 25. The backup database is assigned to the secondary system and the secondary transaction log file is renamed as *.OLD 26. The secondary system is restarted 27. The secondary database files are deleted 28, and the converted files in the temporary database are copied to the secondary database 29. Then the secondary and temporary databases are further updated by applying the transaction log 30.

Figure 3:
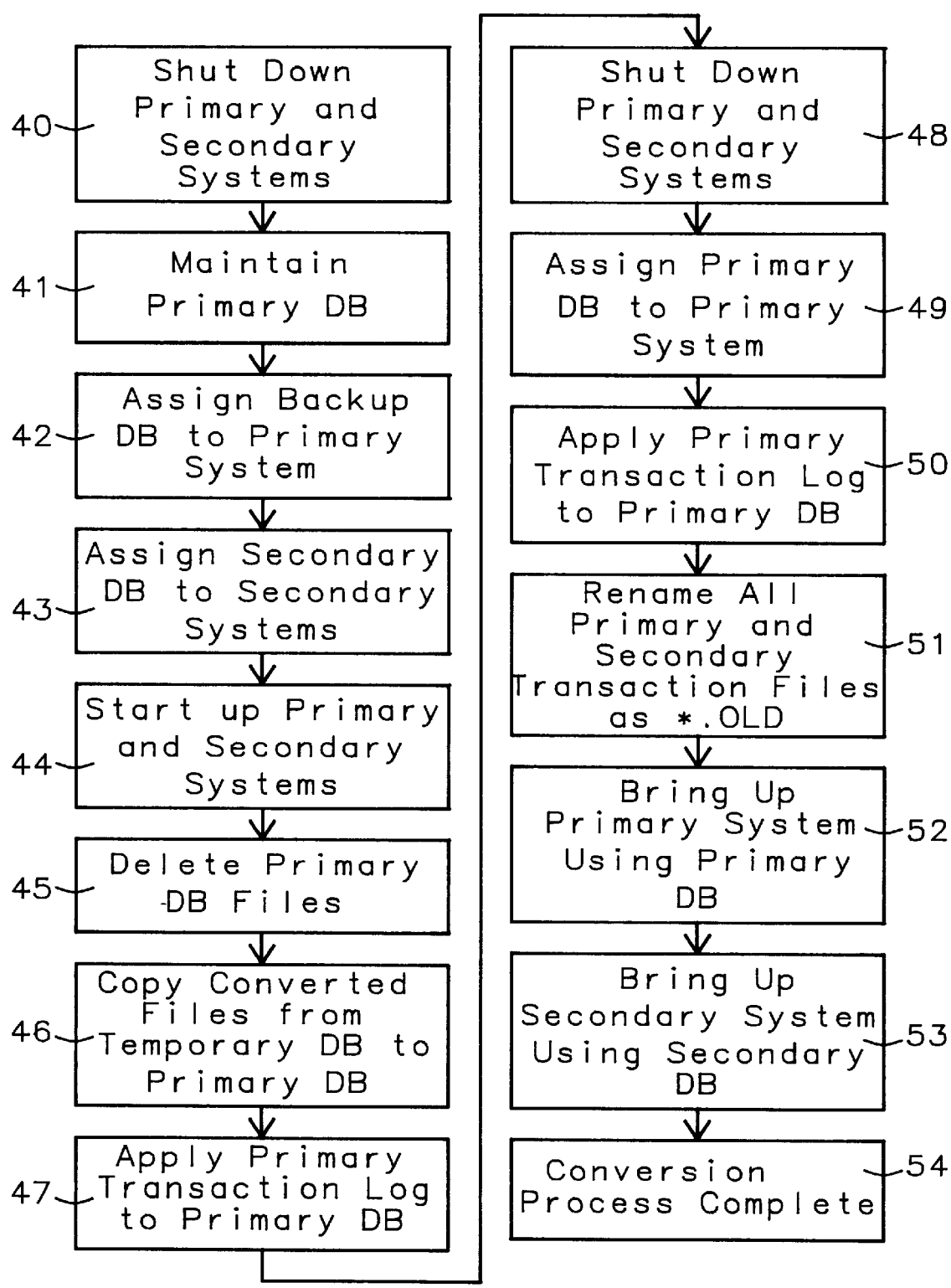
FIG. 3 is a continuation of the flow diagram of the database conversion process.

Referring to FIG. 3, both the primary and secondary system are shutdown 40 while maintaining the primary database 41. The backup database is assigned to the primary system 42 and the secondary database is assigned to the secondary system 43. Next the primary and secondary systems are restarted 44 while the primary database files are deleted 45. Then the converted files in the temporary database are copied to the primary database 46, and the primary transaction log is applied to the primary data base 47 to include the latest changes on the primary database. The primary and secondary databases are once again shut down 48, and the primary data base is assigned to the primary system 49. Once again the primary transaction log is applied to the primary database 50 to capture the latest data. All the primary and secondary transaction files are renamed 51, and the primary system is brought up using the primary database 52. The secondary system is brought up using the secondary database 53, and the conversion process is complete.

Figure 4:
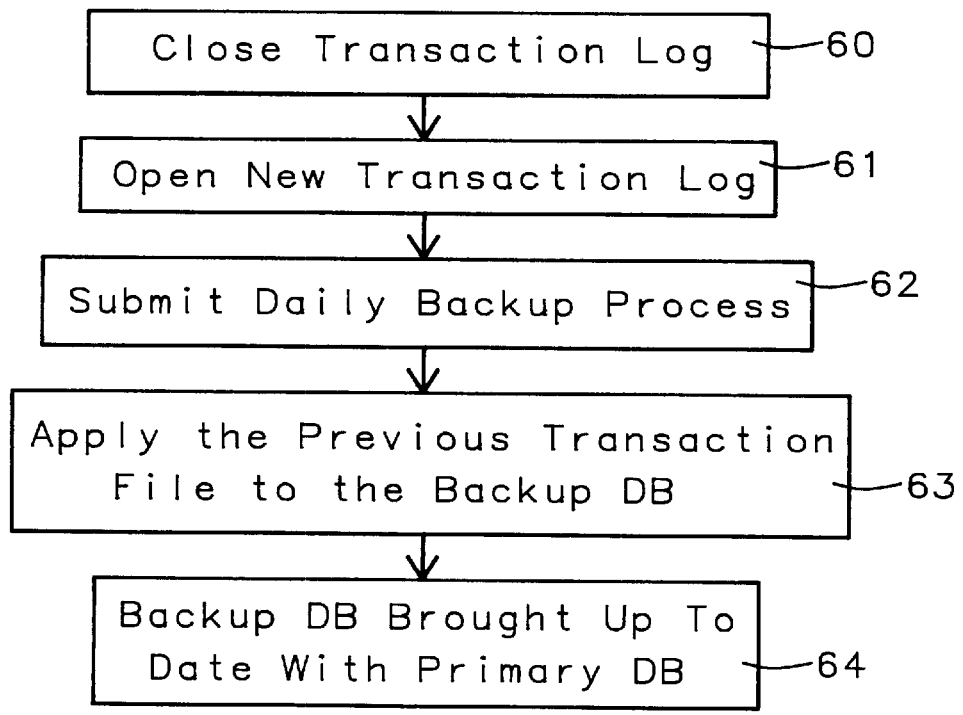
FIG. 4 is a flow diagram showing the daily update of the backup database.

In FIG. 4 is shown the procedure of daily backup 9 of the backup database 10. The transaction log is closed 60 and a new transaction log is opened 61. The daily backup process is started 62 where the transaction log that was just closed is applied to the backup database 63. This brings the backup database up to the same level as the primary database 64 minus any differences logged into the newly opened transaction log 61.

Figure 5:
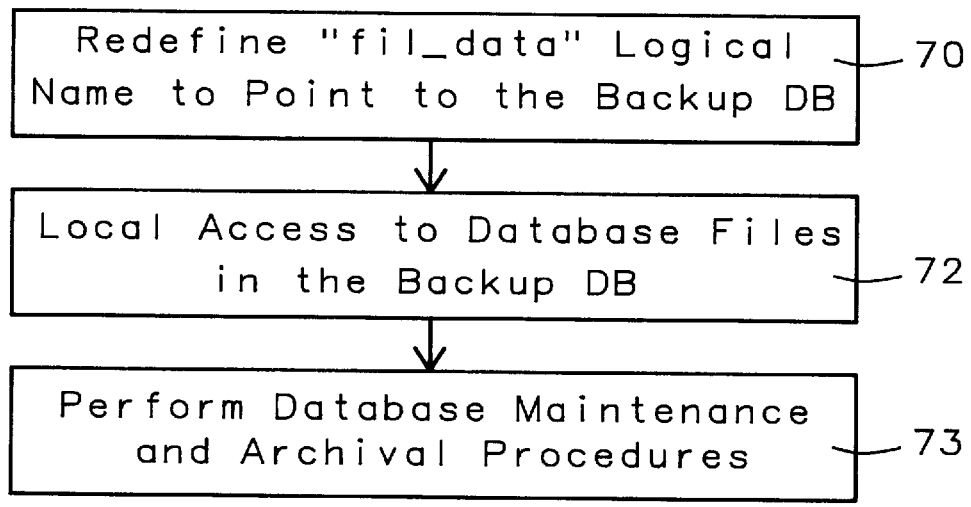
FIG. 5 is a flow diagram showing the maintenance process.

In FIG. 5 is shown the process for archiving data. This process uses the backup database 10 freeing the primary 7 and secondary 8 databases to be used with the primary and secondary systems to do production work. The archiving process includes processes like mark lots for archive, copy archive lots, backup archive directory files and delete archive lots. The logical name of the files contained in the backup database is set to point to the backup database 70. Then the files in the backup database are accessed locally 72 and the appropriate archival procedure is applied to the data 73.

While the invention has been particularly shown and described with reference to preferred embodiments thereof, it will be understood by those skilled in the art that various changes in form and details may be made without departing from the spirit and scope of the invention.

What is claimed is:

1. A database and production information system adapted for high availability, and comprising:
    a) a dual machine architecture having a primary and a secondary side,
    b) each side having a fileserver, a database, a transaction log and a task communicator,
    c) said database on the primary side being a primary database and said database on the secondary side being a secondary database,
    d) said fileserver on the primary side being connected to the primary database, a transaction log, and a task communicator,
    e) the task communicator on the primary side connected to the task communicator on the secondary side,
    f) the primary system communicating with the secondary database through the task communicator on the primary side connected to the task communicator on the secondary side,
    g) the task communicator on the primary side connected to the transaction log,
    h) said transaction log on the primary side connected to a backup database through a daily backup process,
    i) said backup database used for database maintenance thereby increasing the availability of the primary system.

2. The database and production information system of claim 1 wherein the transaction log maintains a record of the incremental changes of the database and is used to provide data to update the backup database.

3. The database and production information system of claim 1 wherein the data in the backup database is updated daily, and comprising:
    a) closing the transaction log,
    b) opening a new transaction log,
    c) applying the closed transaction log to the backup database,
    d) upon completion of the backup process the backup database being caught up with the primary database.

4. The database and production information system of claim 1 wherein the backup database provides a backup for the primary and secondary databases.

5. A database and production information system adapted for high availability by using a backup database for an archival process, and comprising:
    a) a dual machine computing system containing primary, secondary and backup databases,
    b) a production information system running on each machine,
    c) production data stored first in the primary database and then the secondary database,
    d) a transaction log used to tabulate incremental changes to the backup database,
    e) a new transaction log created each day,
    f) daily backup of the backup database using the previous day's transactions log,
    g) all data base maintenance and archive processes use the backup database freeing the primary and secondary databases for production purposes.

6. The database and production information system of claim 5 wherein a lot archiving process on the backup database includes mark lots for archive, copy archive lots, backup archive directory files and delete archive lots, and comprising:
    a) redefine "fil_data" logical name in the archiving process to point to the backup database,
    b) make local access to database files in the backup database,
    c) perform database maintenance and archival procedures.

7. The database and production information system of claim 5 wherein the backup database is periodically archived to tape.

8. A database conversion process done periodically on primary, secondary and backup databases, and comprising:
    a) creating a temporary database using extra disk space,
    b) updating said backup database from the previous day's transaction log,
    c) converting the backup database files to the temporary database,
    d) deleting the files in said backup database and copying the converted files from the temporary database back to the backup database, e) shutting down the secondary production information system while maintaining the secondary database, f) re-establishing the secondary system using the backup database, g) deleting the secondary database and copying the converted files from the temporary database to the secondary database, h) shutting down the primary and secondary production information system while maintaining the primary database, i) re-establishing the primary system using the backup database, and re-establishing the secondary system using the secondary database, j) deleting the primary database and copying the converted files from the temporary database to the primary database, k) shutting down the primary production information system and then restarting the primary production information system using the converted primary database.

9. The database conversion process of claim 8 wherein the temporary database is created to hold data to which all other data bases are converted.

10. The database conversion process of claim 8 wherein the backup database becomes a replacement database for the primary and secondary databases as the primary and secondary databases each become converted allowing the production information system to function with minimal interruption.

11. The conversion process of claim 8 wherein a file pointer is returned to a converted database from the backup database after the conversion process is completed.

12. The conversion process of claim 8 wherein the transaction log is applied to a converted database after database conversion to bring that database up to date with the most recent changes.

* * * * *